(12) United States Patent
Qian et al.

(10) Patent No.: US 9,307,543 B2
(45) Date of Patent: Apr. 5, 2016

(54) PACKET-SWITCHED NETWORK RETURN

(71) Applicant: Spreadtrum Communications (Shanghai) Co., Ltd., Shanghai (CN)

(72) Inventors: Minqian Qian, Shanghai (CN); Wei Han, Shanghai (CN); Xichun Gao, Shanghai (CN); Xia Wei, Shanghai (CN); Yanshan Shi, Shanghai (CN); Xianliang Chen, Shanghai (CN)

(73) Assignee: SPREADTRUM COMMUNICATIONS (SHANGHAI) CO., LTD. (CN)

( * ) Notice: Subject to any disclaimer, the term of this patent is extended or adjusted under 35 U.S.C. 154(b) by 232 days.

(21) Appl. No.: 14/239,018

(22) PCT Filed: Mar. 8, 2013

(86) PCT No.: PCT/CN2013/072355
§ 371 (c)(1),
(2) Date: Feb. 14, 2014

(87) PCT Pub. No.: WO2014/101349
PCT Pub. Date: Jul. 3, 2014

(65) Prior Publication Data
US 2016/0029393 A1    Jan. 28, 2016

(30) Foreign Application Priority Data

Dec. 28, 2012  (CN) .......................... 2012 1 0587475
Dec. 28, 2012  (CN) .......................... 2012 1 0587826
Dec. 28, 2012  (CN) .......................... 2012 1 0587827
Dec. 28, 2012  (CN) .......................... 2012 1 0587828

(51) Int. Cl.
*H04W 72/06*  (2009.01)
*H04W 72/08*  (2009.01)
*H04W 76/04*  (2009.01)

(52) U.S. Cl.
CPC ............ *H04W 72/06* (2013.01); *H04W 72/085* (2013.01); *H04W 76/046* (2013.01)

(58) Field of Classification Search
CPC .............................. H04W 36/08; H04W 36/30
See application file for complete search history.

(56) References Cited

U.S. PATENT DOCUMENTS

2001/0021650 A1*  9/2001  Bilgic ................... H04W 88/02
                                                                455/418
2009/0005052 A1*  1/2009  Abusch-Magder ... H04W 24/02
                                                                455/446

(Continued)

FOREIGN PATENT DOCUMENTS

CN         101472311 A      7/2009
WO       2010098955 A1      9/2010

(Continued)

OTHER PUBLICATIONS

International Search Report for International Application No. PCT/CN2013/072355, mailed Oct. 30, 2013.

(Continued)

*Primary Examiner* — Hassan Kizou
*Assistant Examiner* — Ashil Farahmand
(74) *Attorney, Agent, or Firm* — Cantor Colburn LLP (57) ABSTRACT

Systems and methods for generating a Long Term Evolution network return procedure. A mobile terminal may generate, in absence of redirection instruction from a circuit-switched network, a Long Term Evolution network return procedure that when instantiated by the mobile terminal implements connection of the mobile terminal to a Long Term Evolution network based on a ranking of measured Long Term Evolution network access points.

20 Claims, 5 Drawing Sheets

(56) References Cited

U.S. PATENT DOCUMENTS

2011/0039578 A1* 2/2011 Rowitch ............... G01S 5/0236
455/456.1
2014/0113636 A1* 4/2014 Lee ...................... H04W 36/00
455/437

FOREIGN PATENT DOCUMENTS

| WO | 2011096870 A1 | 8/2011 |
| WO | 2012067968 A1 | 5/2012 |
| WO | 2012087359 A1 | 6/2012 |

OTHER PUBLICATIONS

European Search Report for International App. No. 13184613.1-1854; Dated Jun. 18, 2014; 7 pages.

Ericsson, "Fast Return After CSFB", 3GPP TSG-SA WG2 Meeting #87 (Oct. 10-14, 2011).

Hisilicon Huawei, "How to Return to LTE for CSFB", SA WG2 Meeting #94 New Orleans, USA (Nov. 12-16, 2012).

* cited by examiner

PACKET-SWITCHED NETWORK RETURN

CROSS-REFERENCE TO RELATED APPLICATIONS

The present disclosure claims priority to Chinese patent application No. 201210587827.8, filed on Dec. 28, 2012, and entitled "NETWORK RETURN METHOD FROM 2G/3G NETWORK TO LONG TERM EVOLUTION NETWORK", Chinese patent application No. 201210587828.2, filed on Dec. 28, 2012, and entitled "APPARATUS FOR RESIDING ON LONG TERM EVOLUTION NETWORK AND USER EQUIPMENT", Chinese patent application No. 201210587475.6, filed on Dec. 28, 2012, and entitled "METHOD AND APPARATUS FOR MEASURING LONG TERM EVOLUTION NEIGHBOR CELL IN NON LONG TERM EVOLUTION NETWORK", Chinese patent application No. 201210587826.3, filed on Dec. 28, 2012, and entitled "METHOD FOR USER EQUIPMENT RESIDING ON LONG TERM EVOLUTION NETWORK", the entirety of which is hereby incorporated by reference for all purposes.

BACKGROUND OF THE DISCLOSURE

Evolved Packet System may be considered a core network supporting the Long Term Evolution wireless mobile radio access technology. In general, circuit-switched fallback in Evolved Packet System enables the provisioning of circuit-switched-domain services (e.g., voice service) by reuse of circuit-switched infrastructure when requested by an appropriately configured mobile user equipment. For example, a particular user equipment configured to support Long Term Evolution and a Second Generation and/or Third Generation radio access technology may initiate, on a Long Term Evolution network, access to a particular circuit-switched service through circuit-switched fallback. The Long Term Evolution network may then redirect the user equipment to a particular Second Generation/Third Generation network for circuit-switched service. Following termination of circuit-switched service, the user equipment may return to the Long Term Evolution network independently through cell reselection, or return to the Long Term Evolution network directly based on instruction provided by the Second Generation/Third Generation network.

SUMMARY

This Summary does not in any way limit the scope of the claimed subject matter.

In an aspect, a method for generating a Long Term Evolution (LTE) network return procedure is disclosed. The method may include initiating, by a mobile terminal, connection of the mobile terminal to an LTE network. The method may further include receiving, by the mobile terminal from the LTE network, a system message including a signal strength threshold parameter and at least one of a first listing and a second listing, the first listing specifying a network-wide selection of LTE network access points, and the second listing specifying a subset of LTE network access points of the first listing. The method may further include initiating, by the mobile terminal, a circuit-switched fallback algorithm to establish connection of the mobile terminal to a circuit-switched network (CSN). The method may further include measuring, by the mobile terminal while connected to the CSN, signal strength of LTE network access points selected from one of the first listing and the second listing. The method may further include generating, by the mobile terminal, a ranking of measured LTE network access points exhibiting signal strength at least greater than the signal strength threshold parameter and according to measured signal strength. The method may further include initiating disconnection of the mobile terminal from the CSN. The method may further include generating, by the mobile terminal in absence of redirection instruction from the CSN, a packet-switched network return procedure that, when instantiated by the mobile terminal, implements connection of the mobile terminal to the LTE network based on the ranking of measured LTE network access points.

In another aspect, a computer-implemented method is disclosed. The method may include receiving, by a user equipment from a Long Term Evolution (LTE) network, a signal strength threshold and at least one of a first listing and a second listing, the first listing specifying a network-wide selection of LTE network access points, and the second listing specifying a subset of the network-wide selection of LTE network access points. The method may further include initiating, by the user equipment, circuit-switched fallback to establish connection of the user equipment to a circuit-switched network (CSN). The method may further include measuring, by the user equipment while connected to the CSN, signal strength of LTE network access points selected from one of the first listing and the second listing. The method may further include initiating, by the user equipment, connection of the user equipment to the LTE network based on a priority of measured LTE network access points, the priority based on a ranking of measured LTE network access points exhibiting signal strength at least greater than the signal strength threshold parameter.

In another aspect, a multi-mode mobile user equipment is disclosed. The multi-mode mobile user equipment may include a processing unit and a system memory connected to the processing unit, the system memory including instructions that, when executed by the processing unit, cause the processing unit to instantiate at least one module to generate a packet-switched network return procedure. The at least one module may be configured to receive from a Long Term Evolution (LTE) network a system message including a signal strength threshold parameter, and at least one of a first listing and a second listing, the first listing specifying a network-wide selection of LTE network access points, and the second listing specifying a subset of LTE network access points of the first listing. The at least one module may further be configured to initiate a circuit-switched fallback algorithm to establish connection to a circuit-switched network (CSN). The at least one module may further be configured to measure signal strength of LTE network access points, while connected to the CSN, selected from one of the first listing and the second listing. The at least one module may further be configured to generate a ranking of measured LTE network access points exhibiting signal strength at least greater than the signal strength threshold parameter, and according to measured signal strength. The at least one module may further be configured to generate, in absence of redirection instruction from the CSN, a packet-switched network return procedure that when instantiated implements connection of the multi-mode mobile user equipment to the LTE network based on the ranking of measured LTE network access points.

BRIEF DESCRIPTION OF THE DRAWINGS

A further understanding of the nature and advantages of the present invention may be realized by reference to the remaining portions of the specification, and the drawings, wherein like reference numerals are used throughout to refer to similar components. In some instances, a sub-label may be associated with a reference numeral to denote one of multiple similar components. When reference is made to a reference numeral without specification to an existing sub-label, it is intended to refer to all such multiple similar components.

DETAILED DESCRIPTION OF THE DISCLOSURE

UMTS (Universal Mobile Telecommunication System) is a 3G (Third Generation) wireless telecommunication network technology standard organized and defined by the 3 GPP (Third Generation Partnership Project). In general, a UMTS network is composed of a core network and an access network, where the core network may comprise of a CS (Circuit-Switched) domain and a PS (Packet-Switched) domain. The CS domain provides CS-based services, such as voice service, while the PS domain offers PS-based service, such as Internet access. The 3GPP further organizes, maintains, or formulates 2G (Second Generation) standards such as GSM (Global System for Mobile Communications), GPRS (General packet radio service), EDGE (Enhanced Data rates for GSM Evolution), as well as 3G standards such as W-CDMA (Wideband Code Division Multiple Access) and TD-SCDMA (Time Division Synchronous Code Division Multiple Access). The 3G standard CDMA2000 (Code Division Multiple Access) is generally organized and defined by the 3GPP2 (Third Generation Partnership Project 2).

LTE (Long Term Evolution) is a standard for wireless data communications technology, and supports both TDD (Time-Division Duplexing) and FDD (Frequency Division Duplexing). Among 3GPP standard operations, LTE is directed towards access network evolution, while SAE (System Architecture Evolved) is directed towards core network evolution. Both LTE and SAE, however, focus on optimization of PS domain service, as opposed to a combined PS domain service and CS domain service model. For example, in LTE, traditional CS domain voice service is not supported. Instead, voice service(s) may be provided via alternate methods such as, for example, VoLTE (Voice Over LTE), SVLTE (Simultaneous Voice and LTE), and CSFB (Circuit-Switched Fallback). For most application and purposes, LTE networks are packet switch network (PSN) only, without the implementation of circuit switch network (CSN). In contrast, depending on the application and specific implementations thereof, 3G and/or 2G network comprises CSN and/or PSN. For example, a 3G network may use CSN for voice and PSN for data. In this manner, an LTE network may be considered a packet-switched network; whereas a 2G/3G network may be considered a hybrid of a packet-switched network and a circuit-switched network.

In the example of CSFB, a particular mobile UE (User Equipment) configured to support both LTE and a 2G and/or 3G RAT (Radio Access Technology) may initiate, on an LTE network, access to a particular CS service through CSFB. The LTE network may then redirect the UE to a particular 2G/3G network for CS service. Following termination of CS service, the UE may return to the LTE network independently through "Cell Reselection" or "Fast Return." In Cell Reselection, the UE itself may perform LTE cell reselection based on particular LTE access point requirements or specifications. In Fast Return, the particular 2G/3G network may release LTE neighbor cell information through a Channel Release message or RRC (Radio Resource Control) Connection Release redirection message to direct the UE to return to the LTE network. In Fast Return, the UE does not return to the LTE network independently. Rather, it does so based on instruction from the particular 2G/3G network.

Cell Reselection mode and Fast Return mode may each have certain drawbacks. For example, Cell Reselection may be considered to be relatively "slow," as this implementation may require measurement and assessment by the UE of a number of different LTE access points. In Cell Reselection, an end user may experience an undesired, relatively "long" time delay while the UE transitions from a 2G/3G network connection back to an LTE network connection. In a Fast Return implementation, an end user may not experience a relatively "long" time delay while the UE transitions from a 2G/3G network connection back to an LTE network connection. However, Fast Return may not necessarily be supported by a particular existing 2G/3G network architecture and, in order to realize benefits offered by Fast Return, an "expensive" upgrade of an existing 2G/3G network architecture may be required.

Conventionally, when Fast Return is not supported, Cell Reselection is implemented by a particular UE to reconnect with an LTE network. However, such an implementation may be undesirable at least for the foregoing reasons. The present disclosure addresses these and other issues by providing systems and methods to "actively" return to LTE when Fast Return is not supported by a particular existing 2G/3G network architecture. For example, referring now to FIG. 1, a first example method 100 for implementing a packet-switched network return procedure is shown in accordance with the present disclosure. In general, the example method 100 may be wholly or at least partially implemented by a special-purpose computing system or device, which itself may, in some embodiments, be configured based on implementation-specific requirements or specifications. An example of such a computing system or device may include a mobile multi-mode user equipment or terminal, such as described in detail throughout.

Figure 1:
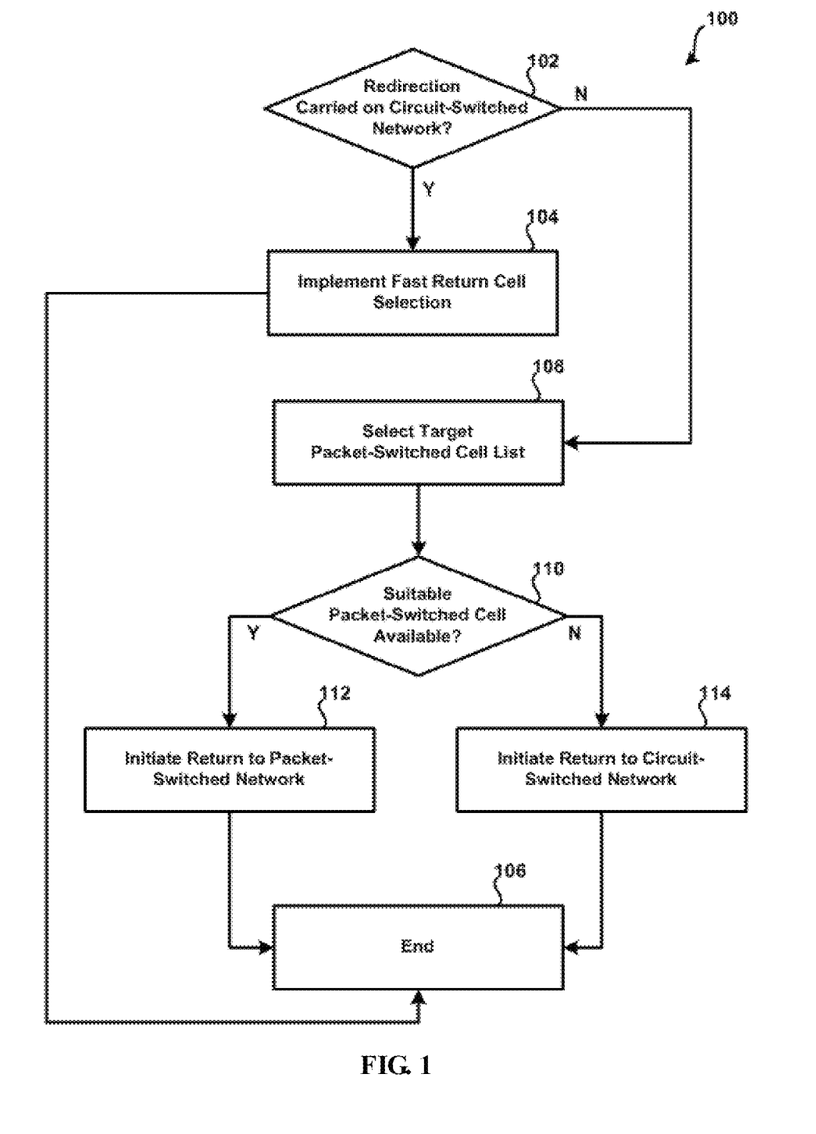
FIG. 1 shows a first example method for implementing a packet-switched network return procedure in accordance with the present disclosure.

At operation 102, a determination may be made as to whether Fast Return is supported by a particular existing 2G/3G network architecture. In this example, a particular UE may have been previously residing on (e.g., "camped-on") a particular cell of an LTE network and then, following a CSFB procedure, the UE may be presently residing on a particular cell of a 2G/3G network accessing a circuit-switched service, such as a voice service. Following or during termination of the circuit-switched service, the 2G/3G network may release LTE neighbor cell information of the LTE network through a Channel Release message, or RRC (Radio Resource Control) Connection Release redirection message, to direct the UE to return to the LTE network. In such a scenario, process flow may proceed to operation 104 whereby the UE may initiate a "Fast Return" LTE cell selection based on instruction(s) provided by the 2G/3G network. Subsequently, process flow within the example method 100 may proceed to termination at operation 106, corresponding to the UE residing on a particular cell of the LTE network. Such an implementation as described in connection with operations 102, 104, and 106 may beneficial in many respects. For example, it may be desirable for an end user to experience benefits offered by "Fast Return" LTE cell selection when available.

In instances where the 2G/3G network does not release LTE neighbor cell information through a Channel Release message or RRC (Radio Resource Control) Connection Release redirection message, process flow may proceed to operation 108. At operation 108, the UE may begin a procedure that when implemented identifies a "preferred" LTE cell of the LTE network to establish connection thereto. This may be performed in order to establish reconnection (e.g., "reconnection" because the UE was previously connected to the LTE network at operation 102) of the UE with the LTE network following termination of CS service. Such a procedure may be referred to as "packet-switched network return." For example, at operation 108, the UE may select a "preferred" target cell list from among a number of different lists, each specifying particular ones of a plurality of potential LTE access points by which reconnection of the UE with the LTE network may be realized.

One example of a "target cell list" may be referred to as a "Network LTE Cell List." This list may substantially identify or specify each discoverable LTE access point across the LTE network in its entirety. In this manner, the Network LTE Cell List may be understood to be a "global" list. In general, the Network LTE Cell List may be "broadcast" to the UE at a time at which the UE is connected to the LTE network. This list may, in some embodiments, further include a cell reselection threshold or other preset power threshold parameter such as, for example, an RSRP (Reference Signal Received Power) parameter, such as described in further detail below. Other embodiments are possible.

Another example of a "target cell list" may be referred to as a "Local LTE Cell List." This list may identify or specify a subset of the LTE access points of the Network LTE Cell List. Similar to the Network LTE Cell List, the Local LTE Cell List may be "broadcast" to the UE at a time at which the UE is connected to the LTE network. In this example, LTE access points specified within the Local LTE Cell List may each be associated with a geographic location of the UE at a time when the UE is connected to the LTE network. In this manner, the Local LTE Cell List may be understood to be a "localized" list that reflects physical location of the UE at a particular point in time. This list may, in some embodiments, further include a cell reselection threshold or other preset power threshold parameter (e.g., RSRP/RSRP threshold). Other embodiments are possible.

Another example of a "target cell list" may be referred to as a "Return LTE Cell List." Similar to the Local LTE Cell List, the Return LTE Cell List may identify or specify a subset of the LTE access points of the Network LTE Cell List. The Return LTE Cell List, however, may be "broadcast" to the UE at a time at which the UE is connected to a particular 2G/3G network while, for example, the UE is accessing a particular circuit-switched service. In this example, LTE access points specified within the Return LTE Cell List may each be associated with a geographic location of the UE at a time when the UE is connected to the 2G/3G network. In this manner, the Release LTE Cell List may be understood to be a "localized" list that is more "up-to-date" than the Local LTE Cell List. This is because the UE may potentially change physical location between a time that the UE receives the Local LTE Cell List (e.g., while "camped-on" a particular LTE cell at operation 102), and a time that the UE receives the Release LTE Cell List (e.g., while "camped-on" a particular 2G/3G cell at operation 102, 108, etc.). This list may, in some embodiments, further include a cell reselection threshold or other preset power threshold parameter (e.g., RSRP/RSRP threshold). Other embodiments are possible.

The Network LTE Cell List, Local LTE Cell List, and the Return LTE Cell List are described in further detail below at least in connection with FIG. 2 and FIG. 3. In general, the Network LTE Cell List, Local LTE Cell List, and Return LTE Cell List may be received and stored on a particular UE. In other examples, one or more of the Network LTE Cell List, Local LTE Cell List, and Return LTE Cell List may be unavailable, and may not be received and stored on a particular UE.

Selection of a preferred target cell list from among the number of different lists at operation 108 may be implemented by the UE in accordance with one or more criteria. In general, a "preferred" target cell list is selected by the UE because the UE may be required to measure or otherwise quantify signal strength of particular LTE access points. Such an implementation be wasteful in terms of power consumption when performed across multiple LTE cell lists. In particular, it may be preferable to measure or otherwise quantify signal strength of LTE access points within only one of a plurality of LTE Cell Lists. In this example, a "priority" may be established where the Return LTE Cell is preferable to the Network-Wide LTE Cell List, and the Network LTE Cell List is preferable to the Local LTE Cell List. Accordingly, when all three of these lists are available, the Return LTE Cell may be selected by the UE as a preferred target cell list at operation 108. Alternatively, when the Return LTE Cell is unavailable, but the Network LTE Cell List and the Local LTE Cell List are available, the Network LTE Cell List may be selected by the UE as a preferred target cell list at operation 108. Alternatively, when the Return LTE Cell and the Network LTE Cell List are unavailable, but the Local LTE Cell List is available, the Local LTE Cell List may be selected by the UE as a preferred target cell list at operation 108. Still other embodiments are possible.

For example, other variations in "priority" may be established. For example, in instances wherein the Return LTE Cell List was previously available, but is no longer available, such as may occur upon intra/inter-system handover from a particular cell configured to broadcast a Return LTE Cell List to a particular cell not configured to broadcast a Return LTE Cell List, a priority may be established where the Network LTE Cell List is preferable to the Local LTE Cell List. Another priority may optionally, or alternatively, be established where an available Return LTE Cell List may be preferable to the Network LTE Cell List, even when a Return LTE Cell List was (is) not broadcast by a "current" cell, and the Network LTE Cell List may be preferable to the Local LTE Cell List.

Still other embodiments are possible in selection of a "preferred" target cell list from among a number of different LTE cell lists at operation 108. For example, a validity test may be performed by the UE to further optimize and determine whether the Return LTE Cell, Network LTE Cell List, and the Local LTE Cell List are valid. Following determination of validity, a preferred target cell list may be selected by the UE according to the above-mentioned priority criteria. For example, the Return LTE Cell, Network LTE Cell List, and the Local LTE Cell List may be evaluated as valid or invalid in accordance with change of LAI (Location Area Identity), RAI (Routing Area Identity), and/or CID (Cell Identification). In this manner, physical movement or displacement of the UE may be more fully considered. For example, in instances where CID does not change, the Return LTE Cell, Network LTE Cell List, and the Local LTE Cell List may each be considered valid. In this example, a priority may then be established where the Return LTE Cell may be preferable to the Network LTE Cell List, and the Network LTE Cell List may be preferable to the Local LTE Cell List. Other embodiments are possible.

In example instances where CID changes, but LAI does not change, the Network LTE Cell List may be considered valid. In this example, a priority may then be established where the Network LTE Cell List is preferable, and then Return LTE Cell List and Local LTE Cell List are disregarded. In example instances where both LAI and RAI change, the Network LTE Cell List and the Local LTE Cell List may be considered invalid. In this example, a priority may then be established where the Return LTE Cell List may be preferable, and the Network LTE Cell List and the Local LTE Cell List may be disregarded. Still other actions may further be taken based on physical movement or displacement of the UE. For example, the Network LTE Cell List and the Local LTE Cell List may no longer be stored by the UE upon change in LAI. Additionally, or alternatively, when the Return LTE Cell List is unavailable for a "prior" cell when LAI and RAI change, the UE may be configured to enter Cell Reselection mode, effectively exiting from the example method 100. Still other embodiments are possible in selection of a preferred target cell list from among the number of different lists at operation 108.

At operation 110, the UE may determine whether a "suitable" LTE access point as listed within the "preferred" target cell list selected at operation 108 is available, such that reconnection of the UE with the LTE network may be realized. In this example, the UE may make such a determination by first measuring signal strength of each LTE access point listed within the selected target cell list, and then comparing each respective measured signal strength(s) against a cell reselection threshold or other preset power threshold. In this example, a particular "suitable" LTE access point with a "strongest" signal at least greater than the cell reselection threshold or other preset power threshold may be selected as a "suitable" LTE access point. For example, assuming that there are three (3) LTE access points identified as a having a signal strength at least greater than the cell reselection threshold or other preset power threshold, a particular one (1) of the three (3) LTE access points with the "strongest" signal may be selected as a "suitable" LTE access point. In this example, process flow may proceed to operation 112 at which the UE may initiate reconnection of the UE with the LTE network in a "packet-switched network return" implementation according the principles of the present disclosure. Subsequently, process flow within the example method 100 may proceed to termination at operation 106, corresponding to the UE residing on a particular cell of the LTE network.

In instances where the UE determines that a "suitable" LTE access point as listed within the "preferred" target cell list selected at operation 108 is not available, process flow within the example method 100 may proceed to operation 114. At operation 114, the UE may initiate connection of the UE with a particular 2G/3G network in a "circuit-switched network return" implementation according the principles of the present disclosure. Selection of the 2G/3G network at operation 114 may be implemented in accordance with particular criteria. For example, a "priority" may be established where the UE resides in the system accepting service when CS service is ended, that is, the UE may "camp-on" a 2G cell in a 2G system when CS service is ended in the 2G system, or the UE may "camp-on" a 3G cell in a 3G system when CS service is ended in the 3G system. In another example, the UE may preferentially attempt to "camp-on" a 2G cell in a 2G system. Such an implementation may be beneficial in many respects. For example, a 2G system generally has better coverage area than a 3G system. In another example, the UE may preferentially attempt to "camp-on" a 3G cell in a 3G system. Such an implementation may be beneficial in many respects. For example, a 3G system generally has higher data rates than a 2G system. Following connection of the UE with the 2G/3G network at operation 114, process flow within the example method 100 may proceed to termination at operation 106, corresponding to the UE residing on a particular cell of the 2G/3G network.

Further scenarios and beneficial aspects associated with implementing packet-switched network return in accordance with the present disclosure are described below in connection with FIGS. 2-5.

Figure 2:
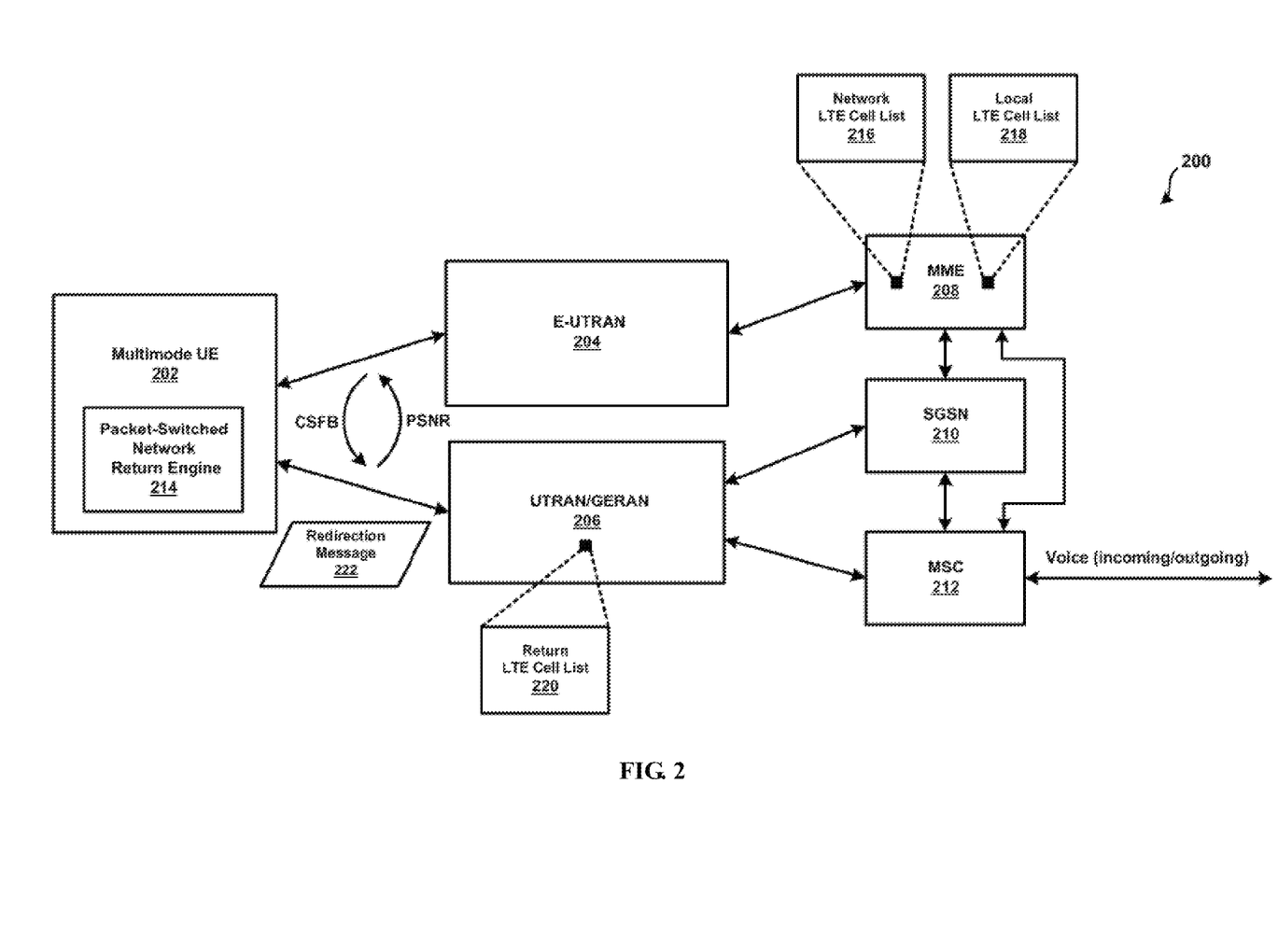
FIG. 2 shows a block diagram of an example EPS architecture for packet-switched network return is shown in accordance with the present disclosure.

For example, referring now to FIG. 2, a block diagram 200 of an example EPS architecture for packet-switched network return is shown. For brevity, the example block diagram 200 is depicted in a simplified and conceptual form, and may generally include more or fewer systems, devices, networks, and/or other components as desired. Further, number and type of features or elements incorporated within the block diagram 200 may or may not be implementation-specific. Still further, while certain connections are shown between respective features or elements within the block diagram 200, other additional or alternative connections are possible.

In the present example, the block diagram 200 illustrates a multi-mode UE 202, a E-UTRAN (Evolved UMTS Terrestrial Radio Access Network) 204, a UTRAN/GERAN (UMTS Terrestrial Radio Access Network/GSM EDGE Radio Access Network) 206, at least one MME (Mobile Management Entity) 208, at least one SGSN (Serving GPRS Support Node) 210, and at least one MSC (Mobile Switching Center) 212. The example UE 202 includes a PS network return engine 214 configured to implement aspects of PSNR (Packet-switched Network Return) in accordance with the present disclosure. The example UE 202 may correspond to the UE described above in connection with FIG. 1. However, other embodiments are possible. The example MME 208 includes a Network LTE Cell List 216 and a Local LTE Cell List 218. The example UTRAN/GERAN 206 includes a Return LTE Cell List 220. The example Network LTE Cell List 216, Local LTE Cell List 218, and Return LTE Cell List 220 may correspond to similarly named elements described above in connection with FIG. 1. However, other embodiments are possible. Although not explicitly shown in FIG. 2, one or more of the Network LTE Cell List 216, Local LTE Cell List 218, and the Return LTE Cell List 220 may be housed wholly or at least partially on one or more different components of the example block diagram 200. For example, in some embodiments, the Network LTE Cell List 216 and/or Return LTE Cell List 220 may be wholly or at least partially stored on the MSC 212. Still other embodiments are possible.

In practice, the MME 208 serves the UE 202 via the E-UTRAN 204 when in LTE access mode, and the SGSN 210 serves the LIE 202 via the UTRAN/GERAN 206 when in 2G/3G access mode, for data services. The MSC 212 serves the UE 202 via the UTRAN/GERAN 206 when in 2G/3G access mode, for voice services. In the example of CSFB, one or both of the MME 208 and the MSC 212 may be configured to coordinate redirection of the UE 202 to the UTRAN/GERAN 206 for CS service upon the UE 202 initiating connection based upon, for example, one of a mobile originating call and a mobile terminating call. In the example of PSNR, one or both of the MME 208 and the MSC 212 may be configured to coordinate redirection of the UE 202 to the E-UTRAN 204 upon the UE 202 initiating termination of a mobile originating call and a mobile terminating call.

For example, following or during termination of CS service, the MSC 212 may release or otherwise broadcast cell information of the E-UTRAN 204 through a redirection message 222 to the UE 202 to return to the E-UTRAN 204. In such a scenario, the engine 214 of the UE 202 may initiate a "Fast Return" LTE cell selection based on instruction(s) provided by the redirection message 222. Subsequently, the UE 202 may reside on a particular cell of the E-UTRAN 204. The redirection message 222 however may not be available to the engine 214 in all instances. In such scenarios, the engine 214 may initiate a procedure that when implemented identifies a "preferred" LTE cell of the E-UTRAN 204 to establish connection thereto, as part of a PSNR process according to the principles of the present disclosure. For example, the engine 214 may select a "preferred" target cell list from among the Network LTE Cell List 216, Local LTE Cell List 218, and the Return LTE Cell List 220, determine whether a "suitable" LTE access point is available as specified within a selected target cell list, and, when available, initiate reconnection of the UE 202 with the E-UTRAN 204 in a manner such as described above in connection with FIG. 1.

Figure 3:
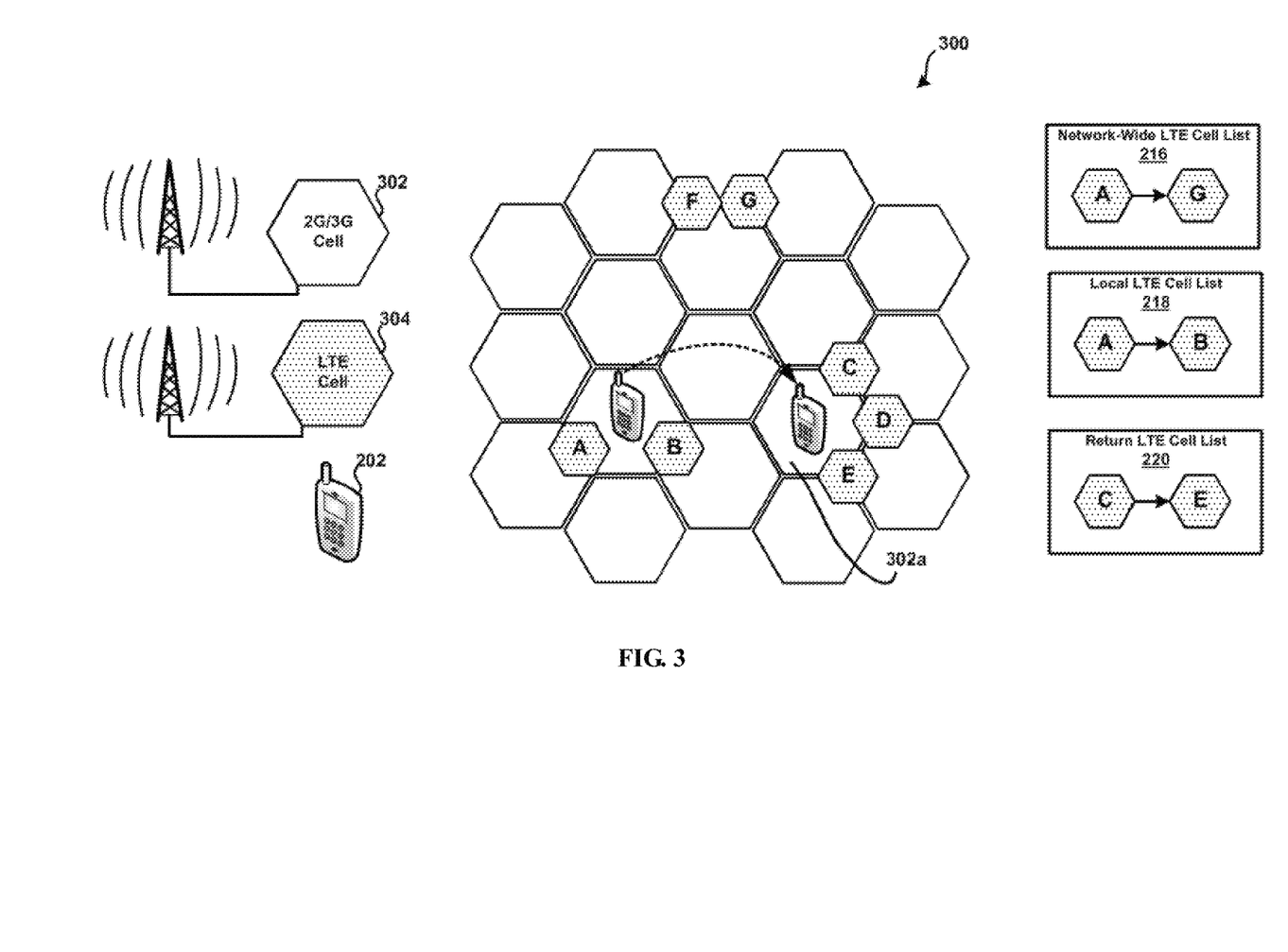
FIG. 3 shows the relationship between example LTE Cell Lists and geographic location of a multi-mode mobile user equipment in accordance with the present disclosure

Referring now additionally to FIG. 3, the relationship between example LTE Cell Lists and geographic location of a multi-mode mobile user equipment is shown in accordance with the present disclosure. In particular, a diagram 300 of FIG. 3 shows overlap between legacy cells 302 of the example UTRAN/GERAN 206, and LTE cells 304 of the example E-UTRAN 204 in relation to position of the UE 202. In this example, the Network LTE Cell List 216 is shown to specify LTE cells "A-G." Here, it is assumed for simplicity that the LTE cells "A-G" correspond to each discoverable LTE access point across the E-UTRAN 204. In this manner, the Network LTE Cell List 216 may be understood to be a "global" list. In general, the Network LTE Cell List 216 may be "broadcast" to the UE 202 at a time at which the UE 202 is connected to E-UTRAN 204. However, other embodiments are possible. For example, the Network LTE Cell List 216 may be "broadcast" to the UE 202 at a time at which the UE 202 is connected to UTRAN/GERAN 206.

In contrast to the Network LTE Cell List 216, the Local LTE Cell List 218 is shown to specify a subset of the LTE cells "A-G" of the Network LTE Cell List 216, namely, LTE cells "A-B." Similar to the Network LTE Cell List 216, the Local LTE Cell List 218 may be "broadcast" to the UE 202 at a time at which the UE 202 is connected to E-UTRAN 204. However, other embodiments are possible. In this example, LTE cells "A-B" as specified within the Local LTE Cell List 218 may each be associated with a geographic location of the UE 202 at a time when the UE 202 is connected to the E-UTRAN 204 such as, for example, when connected the E-UTRAN 204 via LTE cell "A." In this manner, the Local LTE Cell List 218 may be understood to be a "localized" list that reflects physical location of the UE 202 at a particular point in time.

The Return LTE Cell List 220 is shown to specify a subset of the LTE cells "A-G" of the Network LTE Cell List 216, namely, LTE cells "C-E." The Return LTE Cell List 220 may be "broadcast" to the UE 202 at a time at which the UE 202 is connected to, for example a particular legacy cell 302a while the UE 202 is accessing a particular circuit-switched service (e.g., voice service) of the UTRAN/GERAN 206. In this example, LTE cells "C-E" as specified within the Return LTE Cell List 220 may each be associated with a geographic location of the UE 202 at a time when the UE 202 is connected to the UTRAN/GERAN 206 such as, for example, when connected to the legacy cell 302a. In this manner, the Return LTE Cell List 220 may be understood to be a "localized" list that is more "up-to-date" than the Local LTE Cell List 218. This is because, in the example scenario, the UE 202 has changed physical location between a time that the UE 202 receives the Local LTE Cell List 218 (e.g., while "camped-on" LTE cell "A"), and a time that the UE 202 receives Return LTE Cell List 220 (e.g., while "camped-on" the legacy cell 302a). Other embodiments are possible.

Figure 4:
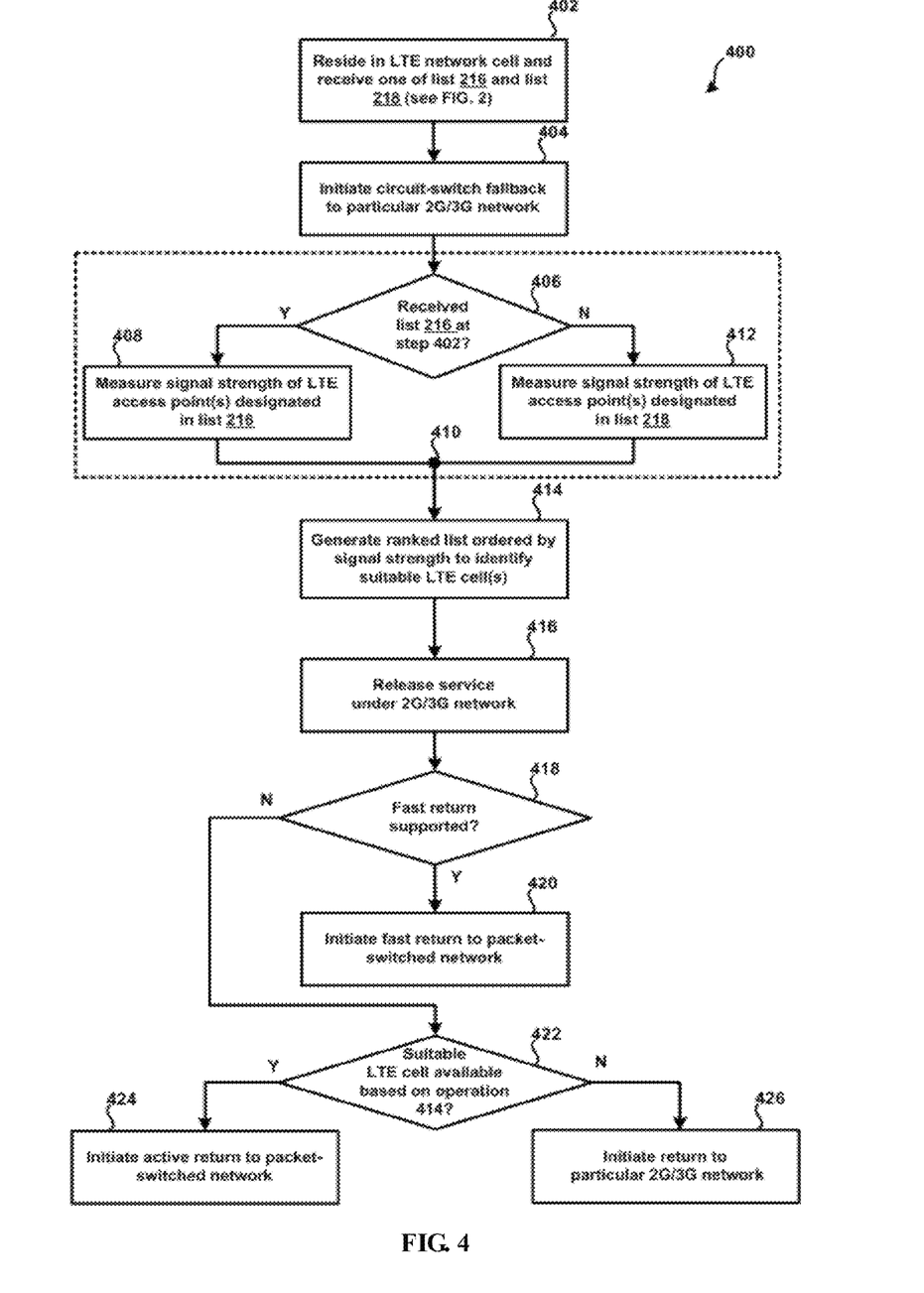
FIG. 4 shows a second example method for implementing a packet-switched network return procedure in accordance with the present disclosure.

Referring now to FIG. 4, a second example method 400 for implementing a packet-switched network return procedure is shown in accordance with the present disclosure. In some embodiments, one or more operations of the example method 400 of FIG. 4 may supplement or otherwise be incorporated within the example method 100 of FIG. 1, and vice versa. In general, the example method 400 may be wholly or at least partially implemented by a special-purpose computing system or device, which itself may, in some embodiments, be configured based on implementation-specific requirements or specifications. For example, the method 400 is described with reference to the UE 202, along with other components of the example block diagram 200, as described above in connection with FIG. 2. Other embodiments are possible.

At operation 402, the UE 202 may "camp-on" a particular cell of the E-UTRAN 204, and receive and store from the E-UTRAN 204 (e.g., MME 208) at least one of the Network LTE Cell List 216 and the Local LTE Cell List 218. In one embodiment, the UE 202 may initiate connection to the E-UTRAN 204 upon a power-on event of the UE 202. Additionally, the UE 202 may enter into an operating state selected from an idle mode and active mode at or during operation 402. In general, idle mode may correspond to a state by which a reduced amount of resources are allocated to communication with the E-UTRAN 204, as compared to active mode. Other embodiments are possible.

At operation 404, the UE 202 may initiate a CSFB procedure based upon one of a mobile originating call and a mobile terminating call. In general, one or both of the MME 208 and the MSC 212 may be configured to coordinate redirection of the UE 202 to the UTRAN/GERAN 206 for CS service associated with the voice call. Upon completion of operation 404, the UE 202 may "camp-on" a particular cell of the UTRAN/GERAN 206 and, in some embodiments may receive and store from the UTRAN/GERAN 206 (e.g., MSC 212) the Return LTE Cell List 220. In this example, when the Return LTE Cell List 220 is received and stored at operation 404, the Network LTE Cell List 216 and the Local LTE Cell List 218 as referred to herein in discussion of the example method 400 may be deemed "invalid," and the UE 202 may be restricted from measuring and storing signal strength of LTE access points specified within the Network LTE Cell List 216 and the Local LTE Cell List 218, meaning that those lists may not be used by the UE 202 to initiate reconnection of the UE 202 with the E-UTRAN 204 in a "packet-switched network return" implementation according the principles of the present disclosure.

At operation 406, a determination may be made as to whether the Network LTE Cell List 216 was received from E-UTRAN 204 at operation 402. Flow may branch to operation 408 upon determination that the Network LTE Cell List 216 was received from E-UTRAN 204 at operation 402. At operation 408, the UE 202 may measure and store signal strength of all LTE access points specified within the Network LTE Cell List 216. Flow may then branch to node 410, discussed further below. Flow may branch to operation 412 upon determination that the Network LTE Cell List 216 was not received from the E-UTRAN 204 at operation 402. At operation 410, the UE 202 may measure and store signal strength of all LTE access points specified within the Local LTE Cell List 218. Flow may then branch to node 410.

At node 410, it may be understood that the UE 202 has measured and stored, in event that the Return LTE Cell List 220 was not received and stored at operation 404, signal strength of all LTE access points specified within, in order of preference, one of the Network LTE Cell List 216 and the Local LTE Cell List 218. In this manner, the example method 400 of FIG. 4 implements a "preferred" target cell list selection in accordance with the present disclosure. Additionally, flow within the method 400 between operation 406 through operation 410 (indicated by intermittent line in FIG. 4) may be considered as a continuous, cyclical process, having a duration anywhere on the order of, for example, seconds to hours. In this manner, determination(s) made at operation 406 may change, for example, upon intra/inter-system handover of the UE 202 between particular cells of a particular RAT. In this example, signal measurement(s) at operation 408 and operation 412 is/are unaffected by intra/inter-system handover of the UE 202.

Flow within the method 400 may then proceed to operation 414. At operation 414, the UE 202 (e.g., engine 214) may initiate a procedure that when implemented identifies whether a "suitable" LTE access point is available from the LTE access points specified at node 410. For example, the UE 202 may initially compare each respective measured signal strength(s) stored at one of operation 408 and operation 412 against a cell reselection threshold or other preset power threshold as included within the respective one of the Network LTE Cell List 216 and the Local LTE Cell List 218. The UE 202 may then generate a ranked list or listing that specifies, in order of "strongest" to "weakest," LTE access points with a signal at least greater than the cell reselection threshold or other preset power threshold. In general, the ranked list may be used by the UE 202 to initiate reconnection of the UE 202 with the E-UTRAN 204 in a "packet-switched network return" implementation, discussed further below.

Flow within the method 400 may then proceed to operation 416. At operation 416, the UE 202 may be released from CS service as provided by the UTRAN/GERAN 206. In some embodiments, following or during termination of CS service, the MSC 212 may release or otherwise broadcast cell information of the E-UTRAN 204 through the redirection message 222 to the UE 202. Next, at operation 418, a determination may be made as to whether the redirection message 222 was received and stored by UE 202 at operation 416. Flow may branch to operation 420 upon determination that the redirection message 222 was received and stored at operation 418. At operation 420, the UE 202 (e.g., the engine 214) may initiate a "Fast Return" LTE cell selection based on instruction(s) provided within the redirection message 222. In some implementations, however, information within the redirection message 222 may be determined to be invalid. For example, even though the redirection message 222 may be received, broadcast cell information of the E-UTRAN 204 may not be contained within the redirection message 222, or may be incorrect, incomplete, etc. In such scenarios, flow may proceed to operation 422 for packet-switched network return procedure in accordance with the present disclosure. Additionally, the redirection message 222 may not be available in all instances. In such a scenario, flow may branch from operation 418 to operation 422 upon determination that the redirection message 222 was not received and stored at operation 416.

At operation 422, a determination may be made as to whether a "suitable" LTE access point is available from the ranked list or listing generated at operation 414. Flow may branch from operation 422 to operation 424 upon determination that a "suitable" LTE access point is available from the ranked list or listing generated at operation 414. At operation 424, the UE 202 (e.g., engine 214) may initiate PSNR and reside or "camp-on" on a particular cell of the E-UTRAN 204. Flow may branch from operation 422 to operation 426 upon determination that a "suitable" LTE access point is not available from the ranked list or listing generated at operation 414. At operation 426, the UE 202 (e.g., engine 214) may initiate return to the UTRAN/GERAN 206, and reside on a particular cell of the UTRAN/GERAN 206. In this manner, the UE 202 may "camp-on" a cell of the particular 2G/3G network used to provide the circuit-switched service.

The example method of FIG. 4 may be beneficial in many respects. For example, when CSFB service is released from the UTRAN/GERAN 206, the UE 202 may "actively" attempt to return to the E-UTRAN 204 when "Fast Return" is unavailable, as opposed to independently implementing "Cell Reselection." This may translate into a "higher" or "faster" acquisition of the E-UTRAN 204 by the US 202, when compared to "Cell Reselection." However, the UE 202 may implement "Fast Return," when available, such that a user may experience benefits offered by "Fast Return" LTE cell selection. Additionally, when the UE 202 resides on a particular 2G/3G network, and voice service has ended and LAC (Local Area Code) is different, LAU/RAU (Location Area Update/Routing Area Update) is not required as is in conventional implementations. Such an implementation according to the aspects of the present disclosure may be more effective in terms of speed in acquiring particular networks, network resource allocation, a decrease in interference, as well as other perceivably positive impacts.

Other benefits and/or advantages of the example method 400 of FIG. 4 may be understood from the above-description provided in connection with FIGS. 1-3.

Figure 5:
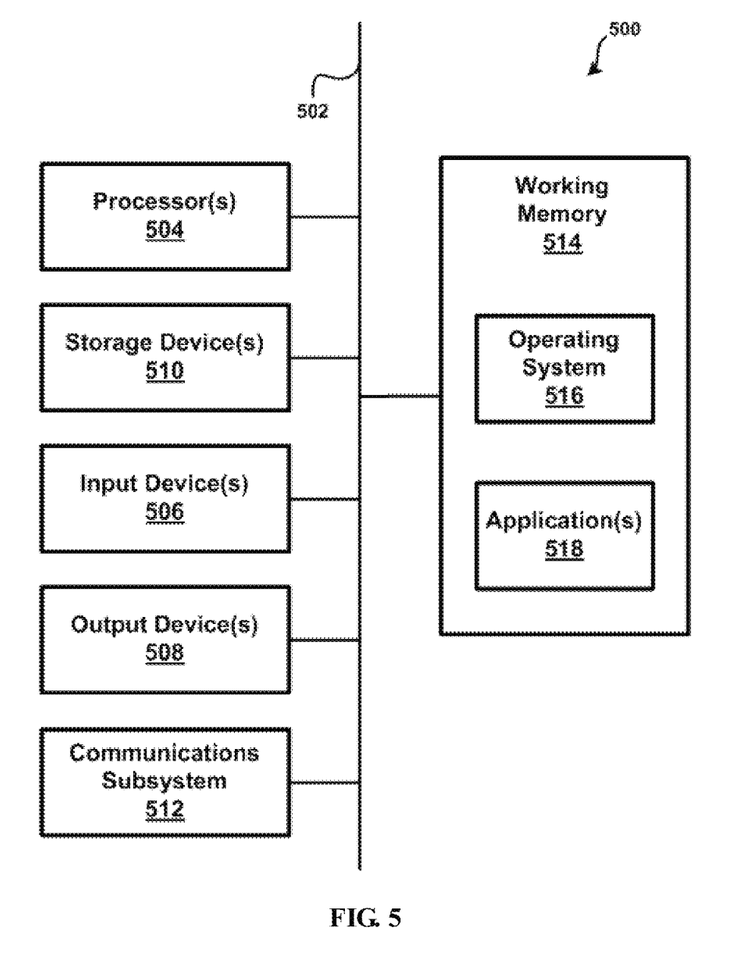
FIG. 5 shows an example computing system or device.

FIG. 5 illustrates an embodiment of an example computer system/device 500. An example of a computer system or device includes a multi-mode mobile user equipment or terminal (e.g., a smartphone configured to access multiple RATs), a server computer, desktop computer, laptop computer, personal data assistant, gaming console, and others. The example computer device 500 may be configured to perform and/or include instructions that, when executed, cause the computer system 500 to perform the example method of FIG. 1 and FIG. 4. It should be noted that FIG. 5 is intended only to provide a generalized illustration of various components, any or all of which may be utilized as appropriate. FIG. 5, therefore, broadly illustrates how individual system elements may be implemented in a relatively separated or relatively more integrated manner.

The computer device 500 is shown comprising hardware elements that can be electrically coupled via a bus 502 (or may otherwise be in communication, as appropriate). The hardware elements may include a processing unit with one or more processors 504, including without limitation one or more general-purpose processors and/or one or more special-purpose processors (such as digital signal processing chips, graphics acceleration processors, and/or the like); one or more input devices 506, which can include without limitation a remote control, a mouse, a keyboard, and/or the like; and one or more output devices 508, which can include without limitation a presentation device (e.g., television), a printer, and/or the like.

The computer system 500 may further include (and/or be in communication with) one or more non-transitory storage devices 510, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer device 500 might also include a communications subsystem 512, which can include without limitation a modem, a network card (wireless or wired), an infrared communication device, a wireless communication device, and/or a chipset (such as a Bluetooth™ device, an 502.11 device, a WiFi device, a WiMax device, cellular communication facilities (e.g., GSM, WCDMA, LTE, etc.), and/or the like. The communications subsystem 512 may permit data to be exchanged with a network (such as the network described below, to name one example), other computer systems, and/or any other devices described herein. In many embodiments, the computer system 500 will further comprise a working memory 514, which can include a RAM or ROM device, as described above.

The computer device 500 may also comprise software elements, shown as being currently located within the working memory 514, including an operating system 516, device drivers, executable libraries, and/or other code, such as one or more application programs 518, which may comprise computer programs provided by various embodiments, and/or may be designed to implement methods, and/or configure systems, provided by other embodiments, as described herein. Merely by way of example, one or more procedures described with respect to the method(s) discussed above, and/or system components might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 510 described above. In some cases, the storage medium may be incorporated within a computer system, such as computer system 500. In other embodiments, the storage medium might be separate from a computer system (e.g., a removable medium, such as flash memory), and/or provided in an installation package, such that the storage medium can be used to program, configure, and/or adapt a general purpose computer with the instructions/code stored thereon. These instructions might take the form of executable code, which is executable by the computer device 500 and/or might take the form of source and/or installable code, which, upon compilation and/or installation on the computer system 500 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer device 500) to perform methods in accordance with various embodiments of the invention. According to a set of embodiments, some or all of the procedures of such methods are performed by the computer system 500 in response to processor 504 executing one or more sequences of one or more instructions (which might be incorporated into the operating system 516 and/or other code, such as an application program 518) contained in the working memory 514. Such instructions may be read into the working memory 514 from another computer-readable medium, such as one or more of the storage device(s) 510. Merely by way of example, execution of the sequences of instructions contained in the working memory 514 might cause the processor(s) 504 to perform one or more procedures of the methods described herein.

The terms "machine-readable medium" and "computer-readable medium," as used herein, refer to any medium that participates in providing data that causes a machine to operate in a specific fashion. In an embodiment implemented using the computer device 500, various computer-readable media might be involved in providing instructions/code to processor(s) 504 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 510. Volatile media include, without limitation, dynamic memory, such as the working memory 514.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 504 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 500.

The communications subsystem 512 (and/or components thereof) generally will receive signals, and the bus 502 then might carry the signals (and/or the data, instructions, etc. carried by the signals) to the working memory 514, from which the processor(s) 504 retrieves and executes the instructions. The instructions received by the working memory 514 may optionally be stored on a non-transitory storage device 510 either before or after execution by the processor(s) 504.

The methods, systems, and devices discussed above are examples. Various configurations may omit, substitute, or add various method steps or procedures, or system components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Furthermore, the example embodiments described herein may be implemented as logical operations in a computing device in a networked computing system environment. The logical operations may be implemented as any combination of: (i) a sequence of computer implemented instructions, steps, or program modules running on a computing device; and (ii) interconnected logic or hardware modules running within a computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for generating a Long Term Evolution (LTE) network return procedure, comprising:
   initiating, by a mobile terminal, connection of the mobile terminal to an LTE network;
   receiving, by the mobile terminal from the LTE network, a system message including a signal strength threshold parameter and at least one of a first listing and a second listing, the first listing specifying a network-wide selection of LTE network access points, and the second listing specifying a subset of LTE network access points of the first listing;
   initiating, by the mobile terminal, a circuit-switched fallback algorithm to establish connection of the mobile terminal to a circuit-switched network (CSN);
   measuring, by the mobile terminal while connected to the CSN, signal strength of LTE network access points selected from one of the first listing and the second listing;
   generating, by the mobile terminal, a ranking of measured LTE network access points exhibiting signal strength at least greater than the signal strength threshold parameter and according to measured signal strength;
   initiating disconnection of the mobile terminal from the CSN; and
   generating, by the mobile terminal in absence of redirection instruction from the CSN, a packet-switched network return procedure that, when instantiated by the mobile terminal, implements connection of the mobile terminal to the LTE network based on the ranking of measured LTE network access points.

2. The method of claim 1, further comprising receiving, by the mobile terminal from the LTE network, the first listing specifying the network-wide selection of LTE network access points.

3. The method of claim 1, further comprising receiving the first listing and the second listing by the mobile terminal from the LTE network; and measuring signal strength of LTE network access points selected from the first listing.

4. The method of claim 1, further comprising the subset of LTE network access points of the first listing each being associated with a geographic location of the mobile terminal while connected to the LTE network.

5. The method of claim 1, further comprising the mobile terminal initiating connection to the CSN upon one of a mobile originating call and a mobile terminating call.

6. The method of claim 1, further comprising implementing connection of the mobile terminal to the LTE network based on the ranking of measured LTE network access points.

7. The method of claim 1, further comprising: receiving the redirection instruction from the CSN; and implementing connection of the mobile terminal to the LTE network based on the redirection instruction.

8. The method of claim 1, further comprising the mobile terminal being in an operating state, prior to initiating the circuit-switched fallback algorithm, selected from an idle mode and active mode.

9. The method of claim 1, further comprising the mobile terminal initiating connection to the LTE network upon a power-on event of the mobile terminal.

10. The method of claim 1, further comprising initiating connection of the mobile terminal to the LTE network for access to a particular packet-switched service; and initiating disconnection of the mobile terminal from the CSN by one of the mobile terminal and the CSN.

11. A computer-implemented method, comprising:
   receiving, by a user equipment from a Long Term Evolution (LTE) network, a signal strength threshold and at least one of a first listing and a second listing, the first listing specifying a network-wide selection of LTE network access points, and the second listing specifying a subset of the network-wide selection of LTE network access points;
   initiating, by the user equipment, circuit-switched fallback to establish connection of the user equipment to a circuit-switched network (CSN);
   measuring, by the user equipment while connected to the CSN, signal strength of LTE network access points selected from one of the first listing and the second listing; and
   initiating, by the user equipment, connection of the user equipment to the LTE network based on a priority of measured LTE network access points, the priority based on a ranking of measured LTE network access points exhibiting signal strength at least greater than the signal strength threshold parameter.

12. The method of claim 11, further comprising receiving, by the user equipment from the LTE network, the first listing specifying the network-wide selection of LTE network access points.

13. The method of claim 11, further comprising receiving the first listing and the second listing by the user equipment from the LTE network; and measuring signal strength of LTE network access points selected from the first listing.

14. The method of claim 11, further comprising initiating circuit-switched fallback upon one of a mobile originating call and a mobile terminating call.

15. A multi-mode mobile user equipment, comprising:
a processing unit; and
a system memory connected to the processing unit, the system memory including instructions that, when executed by the processing unit, cause the processing unit to instantiate at least one module to generate a packet-switched network return procedure, the at least one module configured to:
receive from a Long Term Evolution (LTE) network a system message including a signal strength threshold parameter, and at least one of a first listing and a second listing, the first listing specifying a network-wide selection of LTE network access points, and the second listing specifying a subset of LTE network access points of the first listing;
initiate a circuit-switched fallback algorithm to establish connection to a circuit-switched network (CSN);
measure signal strength of LTE network access points, while connected to the CSN, selected from one of the first listing and the second listing;
generate a ranking of measured LTE network access points exhibiting signal strength at least greater than the signal strength threshold parameter, and according to measured signal strength; and
generate, in absence of redirection instruction from the CSN, a packet-switched network return procedure that when instantiated implements connection of the multi-mode mobile user equipment to the LTE network based on the ranking of measured LTE network access points.

16. The multi-mode mobile user equipment of claim 15, wherein the at least one module is further configured to initiate connection to the CSN upon one of a mobile originating call and a mobile terminating call.

17. The multi-mode mobile user equipment of claim 15, wherein the at least one module is further configured to implement connection to the LTE network based on the ranking of measured LTE network access points.

18. The multi-mode mobile user equipment of claim 15, wherein the at least one module is further configured to transition the user equipment between an operating state selected from an idle mode and active mode.

19. The multi-mode mobile user equipment of claim 15, wherein the at least one module is further configured to receive the redirection instruction from the CSN, and implement connection to the LTE network based on the redirection instruction.

20. The multi-mode mobile user equipment of claim 15, wherein the at least one module is further configured to initiate connection to the LTE network, and initiate disconnection from the CSN.

* * * * *